Nov. 19, 1968  F. DE BUIGNE  3,411,276
POWER-DRIVEN ROTARY MOWER WITH PIVOTAL HANDLE
Original Filed Oct. 16, 1964  4 Sheets-Sheet 2
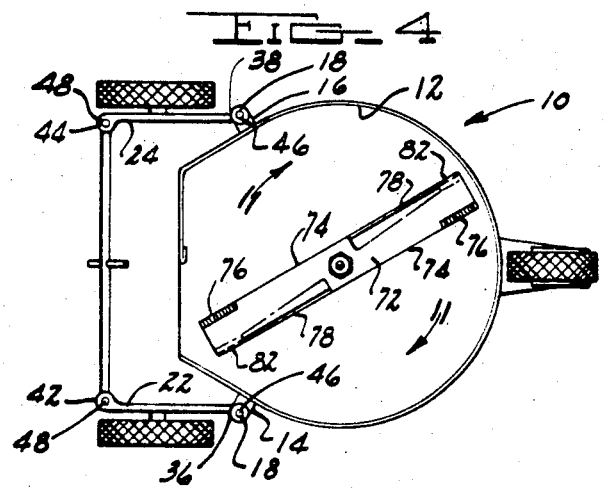
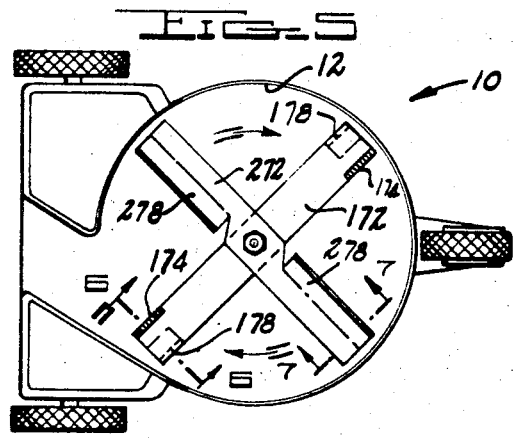
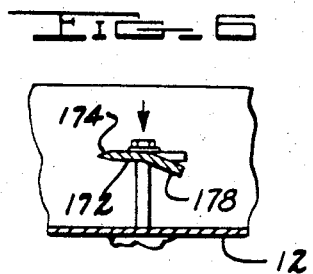
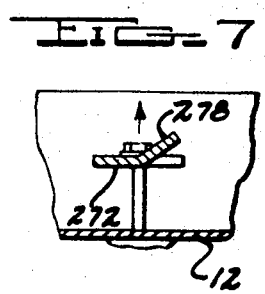
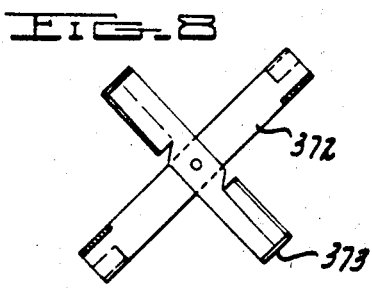
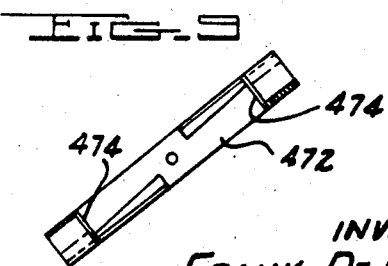
INVENTOR
FRANK DE BUIGNE Nov. 19, 1968          F. DE BUIGNE                3,411,276
POWER DRIVEN ROTARY MOWER WITH PIVOTAL HANDLE
Original Filed Oct. 16, 1964                4 Sheets-Sheet 3

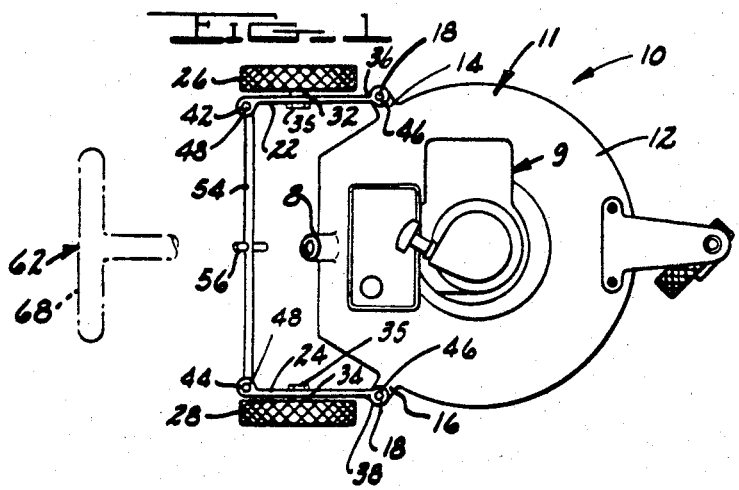
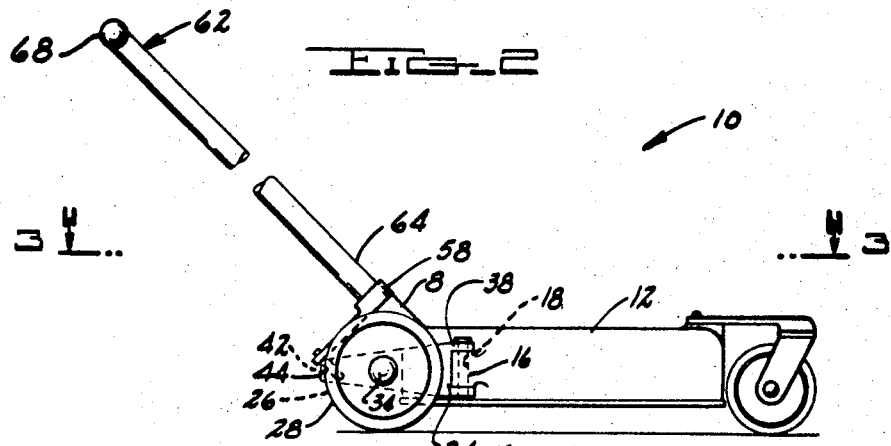
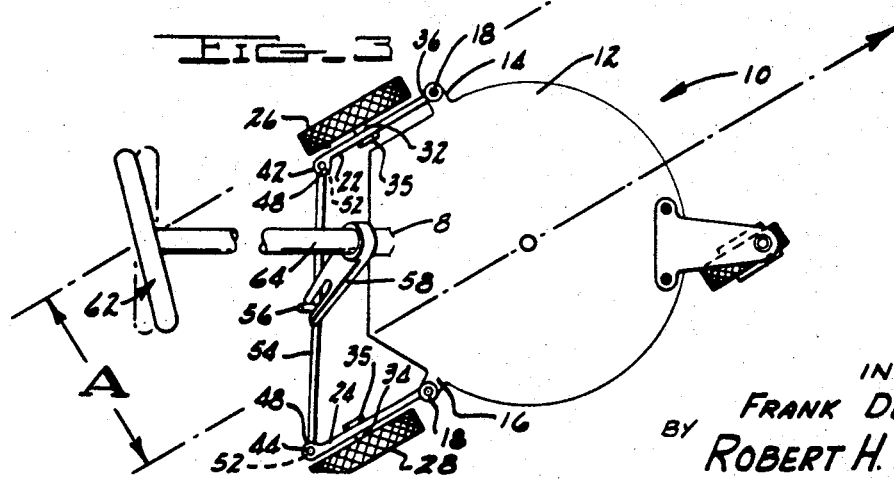

INVENTOR
FRANK DE BUIGNE

Nov. 19, 1968  F. DE BUIGNE  3,411,276
POWER DRIVEN ROTARY MOWER WITH PIVOTAL HANDLE
Original Filed Oct. 16, 1964  4 Sheets-Sheet 4
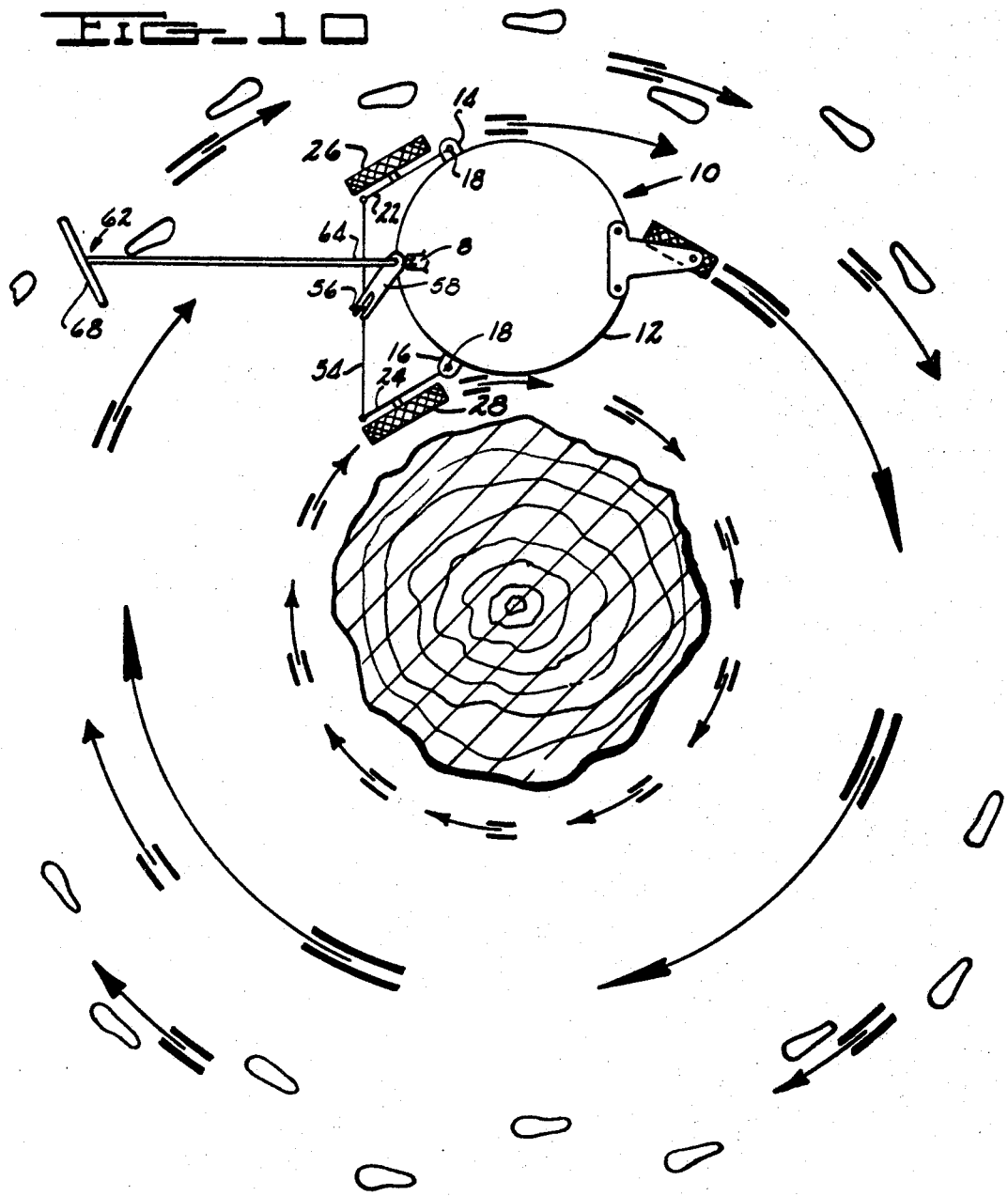
INVENTOR
FRANK DE BUIGNE United States Patent Office 3,411,276
Patented Nov. 19, 1968

3,411,276
POWER DRIVEN ROTARY MOWER WITH
PIVOTAL HANDLE
Frank De Buigne, 1420 Suffield,
Birmingham, Mich. 48009
Original application Oct. 16, 1964, Ser. No. 404,304, now Patent No. 3,382,653. Divided and this application Oct. 9, 1967, Ser. No. 678,768
5 Claims. (Cl. 56—25.4)

ABSTRACT OF THE DISCLOSURE

This invention relates to a steering means for a power driven rotary mower, wherein a pair of wheels are pivotally secured to the mower housing and actuated by a handle member which is connected to a pivotal link between the wheels. Displacement of the handle member displaces the pivotal link and the wheels so as to permit the operator of the mower to traverse a path parallel to the path of said mower thereby avoiding any overhanging bushes, trees or the like which might interfere with the operator.

This application is a division of my copending application Ser. No. 404,304, filed Oct. 16, 1964, and now Patent No. 3,382,653.

As has been previously stated, this invention defines an improved steering mechanism for a power driven rotary mower, while the substantially flat cutter blade is designed in such a manner as to create an air pressure beneath the complete assembly thereby reducing the rolling resistance, while the blade is also deformed in such a manner as to stand the grass before it is cut.

It is therefore a primary object of the present invention to provide a power driven rotary lawn mower which will be easier to operate and which can be directed over a preselected path.

Another object of the invention is the provision of a power driven rotary lawn mower assembly which permits the use of existing components with only slight modification.

Still another object of the present invention is the provision of a power mower which is not only more efficient, but one which can be manufactured at approximately the same cost as those mowers currently being manufactured.

The above and other objects of the present invention can be accomplished by the provision of a power driven rotary lawn mower assembly which has a housing, at least one generally flat cutting blade in said housing, power driving means supported by said housing for rotating said blade, the leading edge of said blade adjacent the point of rotation having a cutting surface thereon while the trailing edge thereof is deformed to form a blower, a pivotal handle on said housing, a plurality of wheels pivotally secured to said housing, a pivotal link interposed between said handle and a second pivotal link disposed between two of said pivotal wheels, displacement of said pivotal handle and link secured thereto actuating said second pivotal link to steer said mower by displacement of the wheels connected thereto, while rotation of the generally flat cutter blade creates an air pressure which lifts the housing and parts secured thereto to reduce the rolling resistance of the complete mower assembly.

Other objects of this invention will appear in the following description and appended claims, reference being had to the accompanying drawings forming a part of this specification wherein like reference characters designate corresponding parts in the several views.

In the drawings:

FIGURE 1 is a plan view of a power driven rotary lawn mower which embodies the present invention.

FIGURE 2 is an elevational view of the mower assembly shown in FIGURE 1, with the handle shown in position and the power driving means omitted.

FIGURE 3 is a view taken substantially along lines 3—3 of FIGURE 2, to illustrate the steering mechanism of the invention, the power driving means having been omitted for purposes of simplicity.

FIGURE 4 is a bottom view of the underside of the mower shown in FIGURE 1.

FIGURE 5 is a bottom view of the underside of a modified form of the present invention, wherein only one wheel is pivotal.

FIGURE 6 is a sectional view taken along lines 6—6 of FIGURE 5.

FIGURE 7 is a sectional view taken along lines 7—7 of FIGURE 5.

FIGURE 8 is another form of the present invention.

FIGURE 9 is still another modified form of the present invention.

FIGURE 10 is a diagrammatic view of a power driven lawn mower which embodies the present invention and indicates one proposed path around a tree with overhanging branches.

Figure 4A:
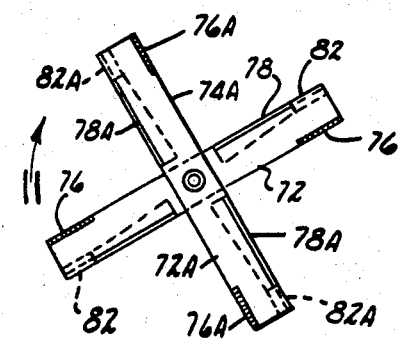
FIGURE 4A is a modified form of the invention similar to FIGURE 4, wherein two blades are used.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology herein is for the purpose of description and not of limitation.

In the drawings, FIGURE 1 illustrates a plan view of a power driven rotary lawn mower 10, which assembly embodies the present invention. The mower housing assembly 12 is of the same general configuration as any commercially manufactured unit which is currently available, with one exception. The exception being two extensions 14 and 16 which depend outwardly from the mower housing 12 proper. Each of the extensions 14 and 16 have a round opening 18, which is perpendicular to the top of the mower housing 12 and extends through said extensions.

Two generally flat pivotal members 22 and 24 have wheels 26 and 28 rotatably secured thereto. Each of said wheels 26 and 28 are mounted on axles 32 and 34 which are integral with the pivotal members 22 and 24, or are secured to said pivotal members by any suitable means. As illustrated, the axles 32 and 34 are secured to said flat pivotal members 22 and 24 with a nut 35.

The front portions 36 and 38 of each of the pivotal members 22 and 24 are enlarged, as are the rear portions 42 and 44. Each of the enlarged portions 36, 38, 42 and 44 have the central portions thereof cut away to form a forked structure. At right angles to the central cut away portions are located two round openings 46 and 48, in each of the pivotal members 22 and 24. Opening 46 is located in the enlarged portions 36 and 38 of the pivotal members, while opening 48 is located in the enlarged end portions 42 and 44. Each of said openings 46 and 48 are located in generally parallel relationship to each other, as well as the upper and lower surfaces of the pivotal members 22 and 24. The enlarged portions 36 and 38 of the pivotal members are positioned about the extensions 14 and 16. This is accomplished with a pin which extends through the openings 18 and 46 respectively, and which are in alignment. A similar type pin extends through opening 48 and the aligned opening 52 in the pivotal link 54 which is between the pivotal members 22 and 24.

Centrally positioned between the ends of the pivotal link 54 is a pin 56, which is cooperable with a forked member 58 that is rigidly secured to a rotatable handle member 62. The inner end of the handle 62 is identified by the numeral 64 and is rotatable secured to the mower housing 12. The cylindrical end of the handle 62 is located in a socket 8 which is integral with the mower housing 12. The handle may be secured within the opening in the socket 8 by any suitable means, such as a washer and cotter key or snap ring etc., or it may be secured by deforming the end of the handle to render same a fixed part of the mower assembly 10.

The outer end of the handle 62 is identified by the numeral 68 and is of generally T shaped configuration. Therefore, when the T shaped handle grip on the handle 62 is rotated within the socket 8, the forked member 58 secured thereto engages the pin 56 in the pivotal link 54 to displace the wheels and cause the complete assembly to travel in an oblique direction, which in turn will permit the operator to the mower assembly to cut grass or the like beneath trees, bushes and shrubs without having any bodily contact therewith. (See FIGURE 10.) This of course is not possible to accomplish with any mower which is currently available in the marketplace.

In addition to the above, we note in FIGURE 4 that the mower assembly of the present invention is inverted and has a cutter bar 72 which is rotatably secured to the power source such as a gasoline engine 9, shown in FIGURE 1. The leading edge of the cutter bar 72 is identified by numeral 74 and the sharpened portion on each end thereof is identified by the number 76. The trailing edge of the cutter bar 72 is deformed downwardly away from the mower housing at 78 to form a suction device, while the outer end of the trailing edge is deformed upwardly toward the housing 12 at 82. Rotation of the cutter bar during usage will produce two results. First, when the cutter bar 72 is rotated, a suction will be created by the action of the deformed portion 82, to stand the grass up for cutting, while the deformed portion 78 will create a pressure beneath the mower housing which will tend to lift the mower assembly so that the wheel load and the forward movement of the complete assembly will be substantially reduced.

In the modified inverted form of the invention shown in FIGURE 5, a double bar is used. The first bar 172 is the cutter bar and has a sharpened portion on the leading edge of each end thereof identified by the number 174. The trailing edge of the cutter bar 172 is deformed toward the housing at 178 as described in connection with the cutter blade in FIGURE 4. The second bar 272 is disposed at substantially right angles to the cutter bar 172 and the trailing edge thereof 278 is deformed away from the housing to form a blower when said bars are rotated. The operation thereof will be substantially the same as that of the single blade device. The deformed portion 178 of the blade when rotated creates a suction to stand the grass to be cut, while the deformed portion 278 creates a pressure to reduce the wheel load and consequently the energy required to move the wheeled mower assembly over the lawn while cutting same.

In the drawing shown in FIGURE 5, only the forward wheel of the mower assembly is pivotal, while the rear wheels are fixed on a rigid axle, secured to the mower frame. The cutting height of the mower blade can be adjustable when removable axles are used, since in actuality, it merely requires the removal of the respective axles and the replacement thereof in another opening (aligned) which is provided for the purpose.

The configuration of the respective bars 172 and 272 are shown in FIGURES 6 and 7 respectively, while modified forms 372 and 472 are shown in FIGURES 8 and 9. The modified form shown in FIGURE 8 illustrates a double blade which is generally flat, wherein the cutter blade has two cutting edges and is longer than the bar which is deformed away from the housing to form the blower, however, the ends of the blower bar each have a baffle 373 secured at right angles thereto. In the single cutter bar 472 shown in FIGURE 9, the baffle portion 474 is generally the same as previously provided, but located intermediate the ends thereof.

It will be noted in FIGURE 4A that a second blade or cutter bar 72A has been illustrated. This is the same general configuration as cutter bar 72 and each of the identification characters has a suffix "A" thereon, thus eliminating the need for further description of the blade.

Figure 9A:
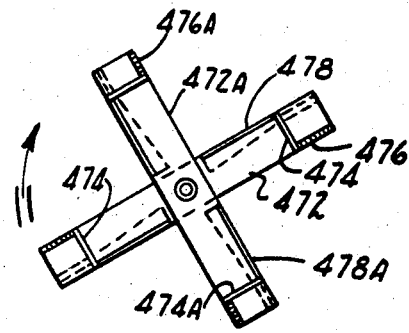
FIGURE 9A is a modified form of the present invention similar to FIGURE 9, wherein two blades are used.

The same may be said for FIGURE 9A, with the exception that the cutter bar 472A is of different length than cutter bar 472. Otherwise the structure is the same. The baffle portion 474 and 474A are merely pieces of generally rectangular material which are secured to the cutter bars 472 and 472A for the purpose of air flow control within the housing when the cutter bars are rotated at high speed. They are secured by welding, brazing, screws, rivets or the like.

FIGURE 10 of the drawings shows a diagrammatic illustration of the mower of the present invention, wherein the handle 62 has displaced the forked member 58 to move the pin 56 on link 54, to move the wheels 26 and 28 mounted on the pivotal members 22 and 24 respectively. When this occurs, the operator follows the outer path indicated by the footprints, while the wheels follow the paths indicated by the arrows. In this manner, any overhanging branches on the tree will not interfere with the operator, since his path is different from that of the mower. Should it be desirable to move in the other direction, the handle member 68 is merely turned in the other direction and a counter-clockwise path around any obstruction is accomplished.

Having thus described my invention, I claim:

1. In a power driven rotary mower assembly, the combination of,
   a housing;
   at least one generally flat cutting blade in said housing;
   power driving means supported by said housing for rotation of said cutting blade;
   the leading edge of said blade having a cutting surface thereon, while the trailing edge thereof is deformed to form a blower;
   a pivotal handle on said housing;
   a plurality of wheels pivotally secured to said housing;
   a pivotal link disposed between two of said pivotal wheels, and a second pivotal link interposed between said handle and said first link, the displacement of said pivotal handle and link secured thereto moving said first mentioned pivotal link to steer said mower by displacement of the wheels connected thereto;
   rotation of the generally flat cutter blade creates an air pressure which tends to lift the housing and parts secured thereto to reduce the rolling resistance of the complete mower assembly.

2. A mower assembly as in claim 1, wherein said wheels are pivotal in a horizontal plane about vertical pivot means.

3. A mower assembly as in claim 1, wherein said housing is flanged downwardly and has two vertically disposed bosses positioned in spaced relationship for receiving the wheel pivots.

4. A mower assembly as in claim 3, wherein the upper and lower surfaces of each of vertical bosses are disposed in a plane parallel to the top of said housing.

5. A mower assembly as in claim 1, wherein said plurality of wheels is three in number.

References Cited

UNITED STATES PATENTS

| | | | |
|---|---|---|---|
| 1,869,746 | 8/1932 | Hoke | 180—19 |
| 2,498,415 | 2/1950 | Gunther | 56—25.4 |
| 2,818,699 | 1/1958 | Clemson | 56—26 |
| 2,956,386 | 10/1960 | Niemann | 56—25.4 |
| 3,029,887 | 4/1962 | Schantz | 180—19 |
| 3,192,692 | 7/1965 | Slemmons | 56—25.4 |
| 3,220,170 | 11/1965 | Smith et al. | 56—255 |

RUSSELL R. KINSEY, *Primary Examiner.*